United States Patent
Omura

(10) Patent No.: US 8,398,880 B2
(45) Date of Patent: Mar. 19, 2013

(54) METHOD OF MODIFYING SURFACE OF POWDER, COATING MATERIAL, METHOD OF MANUFACTURING MAGNETIC RECORDING MEDIUM, AND MAGNETIC RECORDING MEDIUM MANUFACTURED BY THE SAME

(75) Inventor: Kazufumi Omura, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 619 days.

(21) Appl. No.: 12/548,152

(22) Filed: Aug. 26, 2009

(65) Prior Publication Data

US 2010/0055504 A1    Mar. 4, 2010

(30) Foreign Application Priority Data

Aug. 28, 2008    (JP) ................. 2008-219687

(51) Int. Cl.
*G11B 5/70*    (2006.01)
(52) U.S. Cl. ................. 252/62.56; 252/62.63
(58) Field of Classification Search ........... 252/62.51 R, 252/52, 55, 62.56–62.51 C
See application file for complete search history.

(56) References Cited

U.S. PATENT DOCUMENTS 4,427,824 A * 1/1984 Kato et al. .............. 524/858
2003/0143323 A1    7/2003 Noguchi et al.

FOREIGN PATENT DOCUMENTS

| JP | 57-080466 A | 5/1982 |
|---|---|---|
| JP | 2002-080890 A | 3/2002 |
| JP | 2003-132531 A | 5/2003 |
| JP | 2006-048897 A | 2/2006 |
| WO | 99-32424 A1 | 7/1999 |

OTHER PUBLICATIONS

Office Action dated Dec. 6, 2011 on Japanese Application No. 2008-219687, English Translation.

* cited by examiner

*Primary Examiner* — Carol M Koslow
(74) *Attorney, Agent, or Firm* — Sughrue Mion, PLLC

(57) ABSTRACT

An aspect of the present invention relates to a method of modifying a surface of a powder, comprising mixing a powder with a compound denoted by general formula (I):

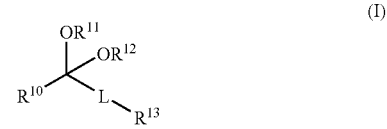

wherein, in general formula (I), each of $R^{10}$ and $R^{13}$ independently denotes a hydrogen atom, alkyl group, or aryl group, each of $R^{11}$ and $R^{12}$ independently denotes an alkyl group or an aryl group, and L denotes a single bond or an oxygen atom.

3 Claims, No Drawings

METHOD OF MODIFYING SURFACE OF POWDER, COATING MATERIAL, METHOD OF MANUFACTURING MAGNETIC RECORDING MEDIUM, AND MAGNETIC RECORDING MEDIUM MANUFACTURED BY THE SAME

CROSS-REFERENCE TO RELATED APPLICATIONS

This application claims the benefit of priority under 35 USC 119 to Japanese Patent Application No. 2008-219687 filed on Aug. 28, 2008, which is expressly incorporated herein by reference in its entirety.

FIELD OF THE INVENTION

The present invention relates to a method of modifying a surface of a powder, more particularly, to a method of modifying a surface of a powder to improve dispersibility of a powder in a coating material.

The present invention further relates to a coating material, a method of manufacturing a magnetic recording medium, and a magnetic recording medium manufactured by the same.

DISCUSSION OF THE BACKGROUND

In recent years, means for rapidly transmitting information have undergone marked development, making it possible to transmit data and images comprising huge amounts of information. As data transmission technology has improved, the need for higher density recording in the recording media and recording and reproduction devices used to record, reproduce, and store information has developed.

In addition to using microgranular magnetic materials, it is known that dispersing microgranular magnetic materials to a high degree and increasing the smoothness of the magnetic layer surface are effective means of achieving good electromagnetic characteristics in the high-density recording region. A magnetic recording medium with a high degree of gloss can also be achieved by increasing the dispersibility of the magnetic material. For increasing the smoothness of the magnetic layer surface, it is also effective to improve dispersibility of nonmagnetic powders in a nonmagnetic layer positioned below a magnetic layer.

As described in Japanese Unexamined Patent Publication (KOKAI) No. 2003-132531 or English language family member US 2003/0143323 A1, for example, one widely employed means of increasing the dispersibility of the magnetic material is to incorporate a polar group such as $SO_3Na$ into the binder. The contents of these applications are expressly incorporated herein by reference in their entirety. Phosphonic acid, phosphoric acids, and the like are known additives that effectively enhance dispersion.

One effective means of improving dispersibility is to incorporate a polar group into the binder (polymer) to cause it to effectively adsorb to the surface of magnetic powder and the like. However, when an excessive quantity of polar groups is incorporated into the binder, dispersibility sometimes diminishes. Accordingly, the use of a dispersing agent is conceivable. However, the dispersion-enhancing effect achieved by the above-described phosphonic acid, phosphoric acids, and the like is inadequate. Further, the use of a dispersing agent to increase the dispersibility of the magnetic layer necessarily causes a decrease in the density of magnetic material in the magnetic layer, and is thus undesirable from the perspective of achieving high density.

SUMMARY OF THE INVENTION

An aspect of the present invention provides for a means of modifying a powder surface to improve the dispersibility of the powder, such as magnetic powder, in a magnetic coating material, and more particularly, to provide a means for increasing the level of adsorption of binder to powder by modifying the powder surface without greatly diminishing the density of magnetic material within the magnetic layer.

To increasing the dispersibility of powder in a system comprising powder and binder, it is important to increase adsorption of the binder to the powder. However, the binders employed in the magnetic layer and nonmagnetic layer are generally highly hydrophobic, and the surface of the powder incorporated into these layers is highly hydrophilic. Thus, the binder tends not to adsorb to the powder surface. Accordingly, the present inventors conducted extensive research into discovering a means of rendering the powder surface hydrophobic, resulting in the discovery that the use of surface-modifying agents in the form of orthoester compounds and acetal compounds enhanced the dispersibility of magnetic powder and nonmagnetic powder. The present inventors attributed the above to the following.

Acid points will normally be present on the surface of magnetic powder. Adsorbed water is also known to be present on the surface of magnetic powder. This adsorbed water is thought to contribute to the hydrophilic property. Additionally, orthoester compounds and acetal compounds both react with water in the presence of an acid catalyst. Thus, when the magnetic powder surface comes into contact with the above compounds, the compounds and the adsorbed water react with the acid point as acid catalyst, which is thought to remove the adsorbed water. The removal of adsorbed water and the increased hydrophobic property of the magnetic powder surface enhance adsorption of magnetic powder and binder, thereby resulting in enhanced dispersion of the magnetic powder.

Further, the alcohol and ester produced by the reaction between the orthoester compound and the water, and the alcohol and ketone produced by the reaction between the acetal compound and water, have lower boiling points than the organic solvents that are generally employed in magnetic layer coating liquids, and can thus be readily removed in a drying step during the manufacturing of a magnetic recording medium. Accordingly, after producing their surface-modifying effects, the orthoester compound and acetal compound do not remain in the magnetic layer, either in their original forms or as reaction products, or remain only in extremely small quantities. Thus, it is thought possible to achieve both a high magnetic powder density and enhance dispersibility by means of the above compounds.

Since adsorbed water and acid points are similarly present in nonmagnetic powder, for the same reasons as above, increasing adsorption of the binder to the nonmagnetic powder is thought to enhance the dispersibility of the nonmagnetic powder.

The present invention was devised on that basis.

An aspect of the present invention relates to a method of modifying a surface of a powder, comprising mixing a powder with a compound denoted by general formula (I):

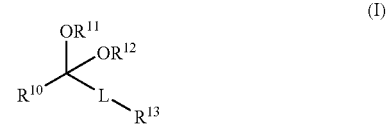

wherein, in general formula (I), each of $R^{10}$ and $R^{13}$ independently denotes a hydrogen atom, alkyl group, or aryl group, each of $R^{11}$ and $R^{12}$ independently denotes an alkyl group or an aryl group, and L denotes a single bond or an oxygen atom.

The powder may be a magnetic powder.

The magnetic powder may be a ferromagnetic hexagonal ferrite powder.

The magnetic powder may be comprised in a magnetic coating material.

The surface of the magnetic powder may be modified to improve dispersibility of the magnetic powder in the magnetic coating material.

The powder may be a nonmagnetic powder.

The nonmagnetic powder may be comprised in a nonmagnetic coating material.

The surface of the nonmagnetic powder may be modified to improve dispersibility of the nonmagnetic powder in the nonmagnetic coating material.

A further aspect of the present invention relates to a coating material comprising a powder and a binder, further comprising a compound denoted by the above general formula (I).

In the coating material, the powder may be a magnetic powder.

The magnetic powder may be a ferromagnetic hexagonal ferrite powder.

The coating material may be a coating liquid (also referred to as "magnetic layer coating liquid" or "magnetic layer-forming coating liquid", hereinafter) for forming a magnetic layer of a magnetic recording medium.

In the coating material, the powder may be a nonmagnetic powder.

The coating material may be a coating liquid (also referred to as "nonmagnetic layer coating liquid" or "nonmagnetic layer-forming coating liquid", hereinafter) for forming a nonmagnetic layer of a magnetic recording medium.

A still further aspect of the present invention relates to a method of manufacturing a magnetic recording medium comprising a magnetic layer on a nonmagnetic support, comprising:

preparing a coating liquid for forming a magnetic layer by mixing a magnetic powder, a binder and a compound denoted by the above general formula (I), and forming a magnetic layer by coating the coating liquid prepared on a nonmagnetic support and drying the coating liquid.

The magnetic powder may be a ferromagnetic hexagonal ferrite powder.

A still further aspect of the present invention relates to a magnetic recording medium comprising a magnetic layer comprising a ferromagnetic powder and a binder on a nonmagnetic support, which is manufactured by the above method.

A still further aspect of the present invention relates to a method of manufacturing a magnetic recording medium comprising a nonmagnetic layer and a magnetic layer in this order on a nonmagnetic support, comprising:

preparing a coating liquid for forming a nonmagnetic layer by mixing a nonmagnetic powder, a binder and a compound denoted by the above general formula (I), and forming a nonmagnetic layer by coating the coating liquid prepared on a nonmagnetic support and drying the coating liquid.

A still further aspect of the present invention relates to a magnetic recording medium comprising a nonmagnetic layer comprising a nonmagnetic powder and a binder and a magnetic layer comprising a ferromagnetic powder and a binder in this order on a nonmagnetic support, which is manufactured by the above method.

The present invention can modify the surface of powder, making it possible to increase the level of adsorption of binder to powder. This can increase the dispersibility of magnetic powder in a magnetic coating material and the dispersibility of nonmagnetic powder in a nonmagnetic coating material.

Other exemplary embodiments and advantages of the present invention may be ascertained by reviewing the present disclosure.

DETAILED DESCRIPTIONS OF THE EMBODIMENTS

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Method of Modifying Surface of Powder

The present invention relates to a method of modifying a surface of a powder. The modifying method of the present invention comprises mixing a powder with a compound denoted by general formula (I).

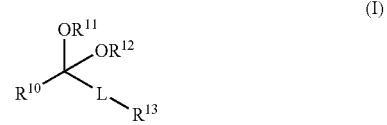

(I)

In general formula (I), each of $R^{10}$ and $R^{13}$ independently denotes a hydrogen atom, alkyl group, or aryl group. Each of $R^{11}$ and $R^{12}$ independently denotes an alkyl group or an aryl group. L denotes a single bond or an oxygen atom. The compound denoted by general formula (I-1) below, in which L denotes an oxygen atom in general formula (I), is an orthoester compound. The compound denoted by general formula (I-2) below, in which L denotes a single bond, is an acetal compound. Orthoester compounds and acetal compounds can enhance the dispersibility of powder for the reasons set forth above.

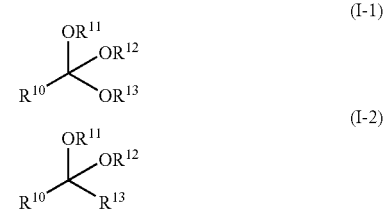

(I-1)

(I-2)

The compound denoted by general formula (I) can be employed singly or in combination of two or more. Hereinafter, the compound denoted by general formula (I) may be referred to as a "surface-modifying agent". The surface-modifying agent may be employed with other compounds having a surface-modifying effect. From the perspective of increasing the magnetic powder density of the magnetic layer, it is preferable not to employ other compounds having a surface-modifying effect.

For example, it is possible to confirm that the surface-modifying agent modifies the powder surface by changing the amount of binder adsorbing to the powder in the coating material based on the presence or absence of the surface-modifying agent, as indicated in Examples further below.

The compound denoted by general formula (I) will be described in greater detail below.

In general formula (I), each of $R^{10}$ and $R^{13}$ independently denotes a hydrogen atom, alkyl group, or aryl group. Each of $R^{11}$ and $R^{12}$ independently denotes an alkyl group or an aryl group.

The alkyl group denoted by $R^{10}$ and/or $R^{13}$ may be linear, branched, or cyclic, and may be substituted or unsubstituted. Examples of the alkyl group are alkyl groups having 1 to 30 carbon atoms, such as methyl, ethyl, n-propyl, isopropyl, t-butyl, n-octyl, eicosyl, 2-chloroethyl, 2-cyanaoethyl, and 2-ethylhexyl groups. Cycloalkyl groups (desirably substituted or unsubstituted cycloalkyl groups having 3 to 30 carbon atoms, such as cyclohexyl, cyclopentyl, and 4-n-dodecylcyclohexyl groups), bicycloalkyl groups (desirably substituted or unsubstituted bicycloalkyl groups having 5 to 30 carbon atoms, that is monovalent groups obtained by removing a hydrogen atom from a bicycloalkane having 5 to 30 carbon atoms), such as bicyclo[1,2,2]heptane-2-yl and bicyclo[2,2,2]octane-3-yl, and structures with even more rings, such as tricyclo structures, are also included.

The aryl group denoted by $R^{10}$ and/or $R^{13}$ is a substituted or unsubstituted aryl group. From the perspective of facilitating removal of the product of the reaction with water by drying, a substituted or unsubstituted aryl group having 6 to 30 carbon atoms is desirable, such as a phenyl, p-tolyl, naphthyl, m-chlorophenyl, or o-hexadecanoylamino group.

From the perspective of facilitating the removal of the product of the reaction with water by drying, $R^{10}$ and $R^{13}$ are desirably hydrogen atoms or alkyl groups with 1 to 3 carbon atoms, such as methyl, ethyl, and propyl groups.

Each of $R^{11}$ and $R^{12}$ independently denotes an alkyl group or an aryl group.

Specific examples, desirable examples, and other details of alkyl groups and aryl groups denoted by $R^{11}$ and $R^{12}$ are as set forth above for the alkyl and aryl groups denoted by $R^{10}$ and $R^{13}$.

Neither the type, number, or substitution position of substituents that may be present on the above alkyl and aryl groups is specifically limited. Specific examples of substituents are halogen atoms (such as fluorine, chlorine, bromine, and iodine atoms, desirably bromine atoms), aryl groups (desirably substituted or unsubstituted aryl groups having 6 to 30 carbon atoms, such as phenyl, tolyl, xylyl, mesityl, biphenylyl, naphthyl, anthryl, phenanthryl, fluorenyl, and pyrenyl groups), and alkyl groups (desirably substituted or unsubstituted alkyl groups having 1 to 20 carbon atoms, such as methyl, ethyl, propyl, isopropyl, n-butyl, sec-butyl, tert-butyl, n-pentyl, neopentyl, hexyl, heptyl, octyl, nonyl, decyl, undecyl, dodecyl, cyclopentyl, cyclohexyl, benzyl, phenethyl, diphenylmethyl, and trityl groups). In this context, the number of carbon atoms for the group comprising one or more substituent refers to the number of carbon atoms of the portion excluding the substituent.

Specific examples of orthoester and acetal compounds denoted by general formula (I) are triethyl orthoformate, triethyl orthoacetate, trimethyl orthoformate, trimethyl orthoacetate, acetone dimethyl acetal, 1,1-dimethoxycyclopentane, 1,1-dimethoxycyclohexane, 3,3-dimethoxyhexane, and the compounds described further below in Examples.

The compound denoted by general formula (I) can be readily synthesized by known methods and is available in the form of commercial products.

The quantity of the compound denoted by general formula (I) that is employed relative to the powder can be suitably established. One to 10 equivalents relative to the moisture contained in the powder such as magnetic powder are desirable, and 0.5 to 5.0 weight parts are preferred. For example, 0.1 to 10 weight parts, desirably 2 to 8 weight parts, can be employed per 100 weight parts of powder. A method of mixing powder and the surface-modifying agent is described further below.

The surface-modifying agent can be used to modify the surface of magnetic powder, nonmagnetic powder, and the like to improve the dispersibility of the powder in coating materials. Thus, it can be employed as a dispersing agent in magnetic and nonmagnetic coating materials. Further, the surface-modifying agent can be readily removed by drying in the form of the reaction product following modification of the powder surface, permitting the modification of the powder surface without greatly reducing the ratio of the total solid component accounted for by the powder in the coating material. Accordingly, the surface-modifying agent is desirably employed as a dispersing agent in coating materials for forming magnetic recording media that require high fill rates (high density), and is preferable for use as a dispersing agent in magnetic layer-forming coating liquids and nonmagnetic layer-forming coating liquids. A description of the method of use of the surface-modifying agent is given further below.

Method of Manufacturing Magnetic Recording Medium and Magnetic Recording Medium

The present invention further relates to:

a method of manufacturing a magnetic recording medium comprising a magnetic layer on a nonmagnetic support, comprising:

preparing a coating liquid for forming a magnetic layer by mixing a magnetic powder, a binder and the surface-modifying agent, and forming a magnetic layer by coating the coating liquid prepared on a nonmagnetic support and drying the coating liquid;

a magnetic recording medium comprising a nonmagnetic layer comprising a nonmagnetic powder and a binder and a magnetic layer comprising a ferromagnetic powder and a binder in this order on a nonmagnetic support, which is manufactured by the above method;

a method of manufacturing a magnetic recording medium comprising a nonmagnetic layer and a magnetic layer in this order on a nonmagnetic support, comprising:

preparing a coating liquid for forming a nonmagnetic layer by mixing a nonmagnetic powder, a binder and the surface-modifying agent, and forming a nonmagnetic layer by coating the coating liquid prepared on a nonmagnetic support and drying the coating liquid; and a magnetic recording medium comprising a nonmagnetic layer comprising a nonmagnetic powder and a binder and a magnetic layer comprising a ferromagnetic powder and a binder in this order on a nonmagnetic support, which is manufactured by the above method.

The magnetic recording medium and the method of manufacturing a magnetic recording medium of the present invention will be described in further detail below.

Preparation of Coating Liquid for Forming Magnetic Layer

The coating liquid for forming a magnetic layer can be prepared by mixing the surface-modifying agent, a magnetic powder, binder, and optionally, one or more additives. Specifically, it can be obtained by the general preparation method for magnetic layer coating liquid. The preparation process can comprise a kneading step, a dispersing step, and a mixing step to be carried out, if necessary, before and/or after the kneading and dispersing steps. Each of the individual steps may be divided into two or more stages. A kneader having a strong kneading force, such as an open kneader, continuous kneader, pressure kneader, or extruder is preferably employed in the kneading step. Details of the kneading process are described in Japanese Unexamined Patent Publication (KOKAI) Heisei Nos. 1-106338 and 1-79274. The contents of these publications are incorporated herein by reference in their entirety. Further, glass beads may be employed to disperse the magnetic layer coating liquid. A dispersing medium with a high specific gravity such as zirconia beads, titania beads, and steel beads is suitable for use as the glass beads. The particle diameter and fill ratio of these dispersing media can be optimized for use. A known dispersing device may be employed.

It is desirable to bring the surface-modifying agent into contact with the magnetic powder surface during, or before, the stage where the magnetic powder and binder are contacted, for addition of the surface-modifying agent to be effective. This is to avoid the binder from coming into contact with the surface of the magnetic powder prior to the surface-modifying agent coming into contact with the magnetic powder surface, so that the surface-modifying agent can contact and react with the magnetic powder surface and produce its effect. Accordingly, the magnetic layer coating liquid is desirably prepared by simultaneously mixing the magnetic powder, binder, and surface-modifying agent, or by first mixing the magnetic powder and surface-modifying agent to obtain a mixture, which is then mixed with the binder. Specifically, the above components are desirably mixed by the method set forth below.

(1) The magnetic powder and the surface-modifying agent are dry dispersed for about 15 to 30 minutes in advance, and then added to an organic solvent. The binder can be simultaneously added with the dispersion, or can be added after the dispersion.
(2) The magnetic powder and the surface-modifying agent are dispersed for about 15 to 30 minutes in an organic solvent, and then dried. The dry mixture is suitably comminuted and then added to an organic solvent. The binder can be simultaneously added with the mixture, or added after the mixture.
(3) The magnetic powder and the surface-modifying agent are dispersed for about 15 to 30 minutes in an organic solvent, after which the binder is added.
(4) The magnetic powder, the surface-modifying agent and the binder are simultaneously added to an organic solvent and dispersed.

Magnetic Powder

Ferromagnetic powders that are commonly incorporated into the coating liquid for forming a magnetic layer of magnetic recording medium can be employed as the magnetic powder. Desirable examples of such ferromagnetic powders are ferromagnetic hexagonal ferrite powders and ferromagnetic metal powders. Ferromagnetic hexagonal ferrite powders are desirable for achieving an excellent surface-modifying effect with the surface-modifying agent.

The number of acid points of the powder such as magnetic powder can be evaluated by the stearylamine adsorption capacity described in Japanese Unexamined Patent Publication (KOKAI) Heisei No. 5-62160, for example. The content of the above application is expressly incorporated herein by reference in its entirety. So that the reaction between the surface-modifying agent and adsorbed water will proceed smoothly on the powder surface, the stearylamine adsorption capacity of the magnetic powder and nonmagnetic powder described further below is desirably 0.5 to 20 $\mu mol/m^2$, preferably 1 to 15 $\mu mol/m^2$. The stearylamine adsorption capacity can be determined by the method described further below in Examples or by the method set forth in Japanese Unexamined Patent Publication (KOKAI) Heisei No. 5-62160.

(i) Hexagonal Ferrite Powder

Examples of hexagonal ferrite powders are barium ferrite, strontium ferrite, lead ferrite, calcium ferrite, and various substitution products thereof such as Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated into the hexagonal ferrite powder in addition to the prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb and the like. Compounds to which elements such as Co—Zn, Co—Ti, Co—Ti—Zr, Co—Ti—Zn, Ni—Ti—Zn, Nb—Zn—Co, Sb—Zn—Co, and Nb—Zn have been added may generally also be employed. They may comprise specific impurities depending on the starting materials and manufacturing methods employed.

As the hexagonal ferrite powder, those having an average plate diameter ranging from 10 to 50 nm are desirably employed. The average plate diameter preferably ranges from 15 to 40 nm, more preferably 15 to 30 nm. The hexagonal ferrite powder with the above size is suitable for use in magnetic recording media for high-density recording. According to the present invention, the dispersibility of microgranular hexagonal ferrite powders such as those with the above-described average plate diameter can be improved.

An average plate ratio [arithmetic average of (plate diameter/plate thickness)] preferably ranges from 1 to 15, more preferably 1 to 7. When the average plate diameter ranges from 1 to 15, adequate orientation can be achieved while maintaining high filling property, as well as increased noise due to stacking between particles can be suppressed. The specific surface area by BET method ($S_{BET}$) within the above particle size range is preferably equal to or higher than 40 $m^2/g$, more preferably 40 to 200 $m^2/g$, and particularly preferably, 60 to 100 $m^2/g$.

Narrow distributions of particle plate diameter and plate thickness of the hexagonal ferrite powder are normally good. About 500 particles can be randomly measured in a transmission electron microscope (TEM) photograph of particles to measure the particle plate diameter and plate thickness, as set forth above. The distributions of particle plate diameter and plate thickness are often not a normal distribution. However, when expressed as the standard deviation to the average size, σ/average size may be 0.1 to 1.0. The particle producing reaction system is rendered as uniform as possible and the particles produced are subjected to a distribution-enhancing treatment to achieve a narrow particle size distribution. For example, methods such as selectively dissolving ultrafine particles in an acid solution by dissolution are known. The pH of the hexagonal ferrite powder is normally about 4 to 12 and usually optimum for the dispersion medium and polymer. From the perspective of the chemical stability and storage properties in the medium, a pH of about 6 to 11 can be selected. Moisture contained in the hexagonal ferrite powder also affects dispersion. The moisture content is usually optimum for the dispersion medium and polymer, normally within a range of 0.01 to 2.0.

Methods of manufacturing the hexagonal ferrite powder include: (1) a vitrified crystallization method consisting of mixing into a desired ferrite composition barium oxide, iron oxide, and a metal oxide substituting for iron with a glass forming substance such as boron oxide; melting the mixture; rapidly cooling the mixture to obtain an amorphous material; reheating the amorphous material; and refining and comminuting the product to obtain a barium ferrite crystal powder; (2) a hydrothermal reaction method consisting of neutralizing a barium ferrite composition metal salt solution with an alkali; removing the by-product; heating the liquid phase to equal to or greater than 100° C.; and washing, drying, and comminuting the product to obtain barium ferrite crystal powder; and (3) a coprecipitation method consisting of neutralizing a barium ferrite composition metal salt solution with an alkali; removing the by-product; drying the product and processing it at equal to or less than 1,100° C.; and comminuting the product to obtain barium ferrite crystal powder. Any manufacturing method can be selected in the present invention. As needed, the hexagonal ferrite powder can be surface treated with Al, Si, P, or an oxide thereof. The quantity can be set to 0.1 to 10 weight percent of the hexagonal ferrite powder. When applying a surface treatment, the quantity of a lubricant such as a fatty acid that is adsorbed is desirably not greater than 100 mg/m$^2$. The hexagonal ferrite powder will sometimes contain inorganic ions such as soluble Na, Ca, Fe, Ni, or Sr. These are desirably substantially not present, but seldom affect characteristics at equal to or less than 200 ppm.

(ii) Ferromagnetic Metal Powder

The ferromagnetic metal powder employed is not specifically limited, but preferably a ferromagnetic metal power comprised primarily of α-Fe. In addition to prescribed atoms, the following atoms can be contained in the ferromagnetic metal powder: Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B and the like. Particularly, incorporation of at least one of the following in addition to α-Fe is desirable: Al, Si, Ca, Y, Ba, La, Nd, Co, Ni, and B. Incorporation of at least one selected from the group consisting of Co, Y and Al is particularly preferred. The Co content preferably ranges from 0 to 40 atom percent, more preferably from 15 to 35 atom percent, further preferably from 20 to 35 atom percent with respect to Fe. The content of Y preferably ranges from 1.5 to 12 atom percent, more preferably from 3 to 10 atom percent, further preferably from 4 to 9 atom percent with respect to Fe. The Al content preferably ranges from 1.5 to 12 atom percent, more preferably from 3 to 10 atom percent, further preferably from 4 to 9 atom percent with respect to Fe.

The ferromagnetic metal powder may contain a small quantity of hydroxide or oxide. Ferromagnetic metal powders obtained by known manufacturing methods may be employed. The following are examples of methods of manufacturing ferromagnetic metal powders: methods of reduction with compound organic acid salts (chiefly oxalates) and reducing gases such as hydrogen; methods of reducing iron oxide with a reducing gas such as hydrogen to obtain Fe or Fe—Co particles or the like; methods of thermal decomposition of metal carbonyl compounds; methods of reduction by addition of a reducing agent such as sodium boron hydride, hypophosphite, or hydrazine to an aqueous solution of ferromagnetic metal; and methods of obtaining powder by vaporizing a metal in a low-pressure inert gas. Any one from among the known method of slow oxidation, that is, immersing the ferromagnetic metal powder thus obtained in an organic solvent and drying it; the method of immersing the ferromagnetic metal powder in an organic solvent, feeding in an oxygen-containing gas to form a surface oxide film, and then conducting drying; and the method of adjusting the partial pressures of oxygen gas and an inert gas without employing an organic solvent to form a surface oxide film, may be employed.

The specific surface area by BET method of the ferromagnetic metal powder employed is preferably 45 to 100 m$^2$/g, more preferably 50 to 80 m$^2$/g. At 45 m$^2$/g and above, low noise can be achieved. At 100 m$^2$/g and below, the magnetic layer with good surface properties can be formed. The crystallite size of the ferromagnetic metal powder is preferably 40 to 180 Angstroms, more preferably 40 to 150 Angstroms, and still more preferably, 40 to 110 Angstroms. The average major axis length (average particle size) of the ferromagnetic metal powder preferably ranges from 10 to 50 nm, more preferably 10 to 40 nm, and further preferably 15 to 30 nm. According to the present invention, the dispersibility of microgranular ferromagnetic metal powders such as those with the above-described average major axis length can be improved. The acicular ratio of the ferromagnetic metal powder is preferably equal to or greater than 3 and equal to or less than 15, more preferably equal to or greater than 3 and equal to or less than 12.

The moisture content of the ferromagnetic metal powder preferably ranges from 0.01 to 2 weight percent. The moisture content of the ferromagnetic metal powder is desirably optimized based on the type of binder. The pH of the ferromagnetic metal powder is desirably optimized depending on what is combined with the binder. A range of 4 to 12 can be established, with 6 to 10 being preferred. As needed, the ferromagnetic metal powder can be surface treated with Al, Si, P, or an oxide thereof. The quantity can be set to 0.1 to 10 weight percent of the ferromagnetic metal powder. When applying a surface treatment, the quantity of a lubricant such as a fatty acid that is adsorbed is desirably not greater than 100 mg/m$^2$. The ferromagnetic metal powder will sometimes contain inorganic ions such as soluble Na, Ca, Fe, Ni, or Sr. These are desirably substantially not present, but seldom affect characteristics at equal to or less than 200 ppm. The ferromagnetic metal powder employed in the present invention desirably has few voids; the level is preferably equal to or less than 20 volume percent, more preferably equal to or less than 5 volume percent. As stated above, so long as the particle size characteristics are satisfied, the ferromagnetic metal powder may be acicular, rice grain-shaped, or spindle-shaped.

Binder

Conventionally known thermoplastic resins, thermosetting resins, reactive resins and mixtures thereof may be employed as binders used. The thermoplastic resins suitable for use have a glass transition temperature of −100 to 150° C., a number average molecular weight of 1,000 to 200,000, preferably from 10,000 to 100,000, and have a degree of polymerization of about 50 to 1,000.

Examples thereof are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins. Further, examples of thermosetting resins and reactive resins are phenol resins, epoxy resins, polyurethane cured resins, urea resins, melamine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. These resins are described in detail in *Handbook of Plastics* published by Asakura Shoten, which is expressly incorporated herein by reference in its entirety. It is also possible to employ known electron beam-cured resins. Examples and manufacturing methods of such resins are described in Japanese Unexamined Patent Publication (KOKAI) Showa No. 62-256219, which is expressly incorporated herein by reference in its entirety. The above-listed resins may be used singly or in combination. Preferred resins are combinations of polyurethane resin and at least one member selected from the group consisting of vinyl chloride resin, vinyl chloride-vinyl acetate copolymers, vinyl chloride-vinyl acetate-vinyl alcohol copolymers, and vinyl chloride-vinyl acetate-maleic anhydride copolymers, as well as combinations of the same with polyisocyanate. Resins suitable for use as binder can be synthesized by known methods, and may be commercially available.

Known polyurethane resins may be employed, such as polyester polyurethane, polyether polyurethane, polyether polyester polyurethane, polycarbonate polyurethane, polyester polycarbonate polyurethane, and polycaprolactone polyurethane. A binder obtained by incorporating as needed one or more polar groups selected from among —COOM, —SO$_3$M, —OSO$_3$M, —P=O(OM)$_2$, and —O—P=O(OM)$_2$ (where M denotes a hydrogen atom or an alkali metal base), —OH, —NR$_2$, —N$^+$R$_3$ (where R denotes a hydrocarbon group), epoxy group, —SH, and —CN into any of the above-listed binders by copolymerization or addition reaction to improve dispersion properties and durability is desirably employed. The quantity of such a polar group ranges, for example, from $10^{-1}$ to $10^{-8}$ mol/g, preferably from $10^{-2}$ to $10^{-6}$ mol/g. Among the above polar groups, a sulfonic acid group (—SO$_3$M) can effectively improve dispersibility of powders. Therefore, binders comprising sulfonic acid group are widely employed as the binder for magnetic recording medium. Also in the present invention, binders comprising sulfonic acid group can be suitably employed.

The quantity of binder added to the magnetic layer coating liquid ranges from, for example, 5 to 50 weight percent, preferably from 10 to 30 weight percent, relative to the weight of the magnetic powder. When employing vinyl chloride resin, the quantity of binder added is preferably from 5 to 30 weight percent; when employing polyurethane resin, from 2 to 20 weight percent; and when employing polyisocyanate, from 2 to 20 weight percent. They may be employed in combination. However, for example, when head corrosion occurs due to the release of trace amounts of chlorine, polyurethane alone or just polyurethane and isocyanate may be employed.

Examples of polyisocyanates are tolylene diisocyanate, 4,4'-diphenylmethane diisocyanate, hexamethylene diisocyanate, xylylene diisocyanate, napthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These polyisocyanates can be synthesized by known methods, and may be commercially available.

In addition to the above-described surface-modifying agent, magnetic powder and binder, the magnetic layer coating liquid can comprise one or more additives normally employed in the coating liquid for forming a magnetic layer of a magnetic recording medium, such as abrasives, lubricants, antifungal agents, antistatic agents, oxidation inhibitors, solvents, and carbon black.

A known organic solvent can be employed. Examples of organic solvents are, in any ratio: ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutylalcohol, isopropylalcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylenechlorhydrin, and dichlorobenzene; N,N-dimethylformamide; and hexane. As set forth above, the reaction product generated following contact and reaction of the surface-modifying agent and the magnetic powder surface normally has a boiling point that is lower than the drying temperature employed in the manufacturing of a magnetic recording medium. Thus, this reaction product can be removed during the drying step in the manufacturing of a magnetic recording medium.

These organic solvents need not be 100 percent pure and may contain impurities such as isomers, unreacted materials, by-products, decomposition products, oxides and moisture in addition to the main components. The content of these impurities is preferably equal to or less than 30 weight percent, more preferably equal to or less than 10 weight percent. To improve dispersion properties, a solvent having a somewhat strong polarity is desirable. It is desirable that solvents having a dielectric constant equal to or higher than 15 are comprised equal to or higher than 50 weight percent of the solvent composition. Further, the dissolution parameter is desirably 8 to 11.

A magnetic layer can be formed by coating and drying the magnetic layer coating liquid that has been prepared, either directly or over other layers, on a nonmagnetic support. Before coating the magnetic layer coating liquid, a nonmagnetic layer coating liquid comprising a nonmagnetic powder and a binder can be coated on the nonmagnetic support. Thus, a magnetic recording medium comprising a nonmagnetic layer and a magnetic layer in this order on a nonmagnetic support can be obtained.

A magnetic layer coating liquid comprising the surface-modifying agent and/or a nonmagnetic layer coating liquid comprising the surface-modifying agent is employed in the method of manufacturing a magnetic recording medium of the present invention. The addition of the surface-modifying agent to the nonmagnetic layer coating liquid can modify the nonmagnetic powder surface, increase adsorption of the nonmagnetic powder and binder in the nonmagnetic layer, and thus improve dispersibility of the nonmagnetic powder.

The nonmagnetic layer coating liquid will be described in greater detail below.

Preparation of Coating Liquid for Forming Nonmagnetic Layer

A nonmagnetic layer coating liquid can be obtained by mixing a nonmagnetic powder, binder, and optionally employed additives. The addition of the surface-modifying agent can modify the nonmagnetic powder surface, increase adsorption of the nonmagnetic powder and binder in the nonmagnetic layer, and thus improve dispersibility of the nonmagnetic powder.

The nonmagnetic powder may be an organic or inorganic substance. Carbon black and the like may be employed. Examples of inorganic substances are metals, metal oxides, metal carbonates, metal sulfates, metal nitrides, metal carbides, and metal sulfides. From the perspective of surface-modifying effect, nonmagnetic metal powders are suitable.

Specifically, titanium oxides such as titanium dioxide, cerium oxide, tin oxide, tungsten oxide, ZnO, $ZrO_2$, $SiO_2$, $Cr_2O_3$, α-alumina with an α-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide may be employed singly or in combinations of two or more. α-iron oxide and titanium oxide are preferred.

The nonmagnetic powder may be acicular, spherical, polyhedral, or plate-shaped. The crystallite size of the nonmagnetic powder preferably ranges from 4 nm to 500 nm, more preferably from 40 to 100 nm. The average particle diameter of the nonmagnetic powder preferably ranges from 5 nm to 500 nm, more preferably from 10 to 200 nm. The nonmagnetic powder with the above size is suitable for use in the nonmagnetic layer coating liquid for the magnetic recording medium for high-density recording. With the surface-modifying agent, nonmagnetic powders with the above size can be dispersed well in a nonmagnetic coating material.

The specific surface area of the nonmagnetic powder preferably ranges from 1 to 150 $m^2/g$, more preferably from 20 to 120 $m^2/g$, and further preferably from 50 to 100 $m^2/g$. Within the specific surface area ranging from 1 to 150 $m^2/g$, a nonmagnetic layer with suitable surface roughness can be achieved and dispersion of the nonmagnetic powder is possible with the desired quantity of binder; the above range is preferred. Oil absorption capacity using dibutyl phthalate (DBP) of the nonmagnetic powder preferably ranges from 5 to 100 mL/100 g, more preferably from 10 to 80 mL/100 g, and further preferably from 20 to 60 mL/100 g. The specific gravity preferably ranges from 1 to 12, more preferably from 3 to 6. The tap density preferably ranges from 0.05 to 2 g/mL, more preferably from 0.2 to 1.5 g/mL. A tap density falling within a range of 0.05 to 2 g/mL can reduce the amount of scattering particles, thereby facilitating handling, and tends to prevent solidification to the device. The pH of the nonmagnetic powder preferably ranges from 2 to 11, more preferably from 6 to 9. When the pH falls within a range of 2 to 11, the coefficient of friction does not become high at high temperature or high humidity, or due to the freeing of fatty acids. The moisture content of the nonmagnetic powder preferably ranges from 0.1 to 5 weight percent, more preferably from 0.2 to 3 weight percent, and further preferably from 0.3 to 1.5 weight percent. A moisture content falling within a range of 0.1 to 5 weight percent is desirable because it can produce good dispersion and yield a stable coating viscosity following dispersion. An ignition loss of equal to or less than 20 weight percent is desirable and nonmagnetic powders with low ignition losses are desirable.

When the nonmagnetic powder is an inorganic powder, the Mohs' hardness is preferably 4 to 10. Durability can be ensured if the Mohs' hardness ranges from 4 to 10. The stearylamine adsorption capacity of the nonmagnetic powder is desirably 1 to 20 $\mu mol/m^2$, preferably 2 to 15 $\mu mol/m^2$, for improving the dispersibility of the nonmagnetic powder with the surface-modifying agent. The heat of wetting in 25° C. water of the nonmagnetic powder is preferably within a range of 200 to 600 $mJ/cm^2$ (approximately 200 to 600 $erg/cm^2$). A solvent with a heat of wetting within this range may also be employed. The quantity of water molecules on the surface at 100 to 400° C. suitably ranges from 1 to 10 pieces per 100 Angstroms. The pH of the isoelectric point in water preferably ranges from 3 to 9. The surface of these nonmagnetic powders preferably contains $Al_2O_3$, $SiO_2$, $TiO_2$, $ZrO_2$, $SnO_2$, $Sb_2O_3$, and ZnO by conducting surface treatment. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. They may be employed singly or in combination. Depending on the objective, a surface-treatment coating layer with a coprecipitated material may also be employed, the method which comprises a first alumina coating and a second silica coating thereover or the reverse method thereof may also be adopted. Depending on the objective, the surface-treatment coating layer may be a porous layer, with homogeneity and density being generally desirable.

Specific examples of nonmagnetic powders are: Nanotite from Showa Denko K. K.; HIT-100 and ZA-G1 from Sumitomo Chemical Co., Ltd.; DPN-250, DPN-250BX, DPN-245, DPN-270BX, DPN-550BX and DPN-550RX from Toda Kogyo Corp.; titanium oxide TTO-51B, TTO-55A, TTO-55B, TTO-55C, TTO-55S, TTO-55D, SN-100, MJ-7, α-iron oxide E270, E271 and E300 from Ishihara Sangyo Co., Ltd.; STT-4D, STT-30D, STT-30 and STT-65C from Titan Kogyo K. K.; MT-100S, MT-100T, MT-150W, MT-500B, T-600B, T-100F and T-500HD from Tayca Corporation; FINEX-25, BF-1, BF-10, BF-20 and ST-M from Sakai Chemical Industry Co., Ltd.; DEFIC-Y and DEFIC-R from Dowa Mining Co., Ltd.; AS2BM and TiO2P25 from Nippon Aerogil; 100 A and 500 A from Ube Industries, Ltd.; Y-LOP from Titan Kogyo K. K.; and sintered products of the same. Particular preferable nonmagnetic powders are titanium dioxide and α-iron oxide.

Details of the binder that is added to the nonmagnetic coating material are identical to those of the binder contained in the magnetic coating material described above. The nonmagnetic coating material may further comprise the various additives and solvents employed in magnetic recording media. Details of individual components in the nonmagnetic layer coating liquid, methods of mixing these components, the quantities in which they are added, and the like are as set forth above with regard to the magnetic layer coating liquid.

Nonmagnetic Layer

Known films of the following may be employed as the nonmagnetic support in the present invention: polyethylene terephthalate, polyethylene naphthalate, other polyesters, polyolefins, cellulose triacetate, polycarbonate, polyamides, polyimides, polyamidoimides, polysulfones, aromatic polyamides, polybenzooxazoles, and the like. Supports having a glass transition temperature of equal to or higher than 100° C. are preferably employed. The use of polyethylene naphthalate, aramid, or some other high-strength support is particularly desirable. As needed, layered supports such as disclosed in Japanese Unexamined Patent Publication (KOKAI) Heisei No. 3-224127, which is expressly incorporated herein by reference in its entirety, may be employed to vary the surface roughness of the magnetic surface and support surface. These supports may be subjected beforehand to corona discharge treatment, plasma treatment, adhesion enhancing treatment, heat treatment, dust removal, and the like.

The center surface average surface roughness (Ra) of the nonmagnetic support as measured with an optical interfero-type surface roughness meter HD-2000 made by WYKO is preferably equal to or less than 8.0 nm, more preferably equal to or less than 4.0 nm, further preferably equal to or less than 2.0 nm. Not only does such a support desirably have a low center surface average surface roughness (Ra), but there are also desirably no large protrusions equal to or higher than 0.5 μm. The surface roughness shape may be freely controlled through the size and quantity of filler added to the support as needed. Examples of such fillers are oxides and carbonates of elements such as Ca, Si, and Ti, and organic powders such as acrylic-based one. The support desirably has a maximum height $R_{max}$ equal to or less than 1 µm, a ten-point average roughness $R_Z$ equal to or less than 0.5 µm, a center surface peak height $R_P$ equal to or less than 0.5 µm, a center surface valley depth $R_V$ equal to or less than 0.5 µm, a center-surface surface area percentage Sr of 10 percent to 90 percent, and an average wavelength $\lambda_a$ of 5 to 300 µm. To achieve desired electromagnetic characteristics and durability, the surface protrusion distribution of the support can be freely controlled with fillers. It is possible to control within a range from 0 to 2,000 protrusions of 0.01 to 1 µm in size per 0.1 mm².

The F-5 value of the nonmagnetic support suitable for use in the present invention desirably ranges from 5 to 50 kg/mm², approximately 49 to 490 MPa. The thermal shrinkage rate of the support after 30 min at 100° C. is preferably equal to or less than 3 percent, more preferably equal to or less than 1.5 percent. The thermal shrinkage rate after 30 min at 80° C. is preferably equal to or less than 1 percent, more preferably equal to or less than 0.5 percent. The breaking strength of the nonmagnetic support preferably ranges from 5 to 100 kg/mm², approximately 49 to 980 MPa. The modulus of elasticity preferably ranges from 100 to 2,000 kg/mm², approximately 0.98 to 19.6 GPa. The thermal expansion coefficient preferably ranges from $10^{-4}$ to $10^{-8}$/° C., more preferably from $10^{-5}$ to $10^{-6}$/° C. The moisture expansion coefficient is preferably equal to or less than $10^{-4}$/RH percent, more preferably equal to or less than $10^{-5}$/RH percent. These thermal characteristics, dimensional characteristics, and mechanical strength characteristics are desirably nearly equal, with a difference equal to less than 10 percent, in all in-plane directions in the support.

An undercoating layer can be provided in the method of manufacturing a magnetic recording medium of the present invention. Providing an undercoating layer can enhance adhesive strength between the support and the magnetic layer or nonmagnetic layer. For example, a polyester resin that is soluble in solvent can be employed as the undercoating layer to enhance adhesion. As described below, a smoothing layer can be provided as an undercoating layer.

Layer Structure

In the magnetic recording medium according to the present invention, the thickness of the nonmagnetic support preferably ranges from 3 to 80 µm, more preferably 3 to 50 µm, and further preferably, 3 to 10 µm. When an undercoating layer is provided between the nonmagnetic support and the nonmagnetic layer or the magnetic layer, the thickness of the undercoating layer is, for example, from 0.01 to 0.8 µm, preferably from 0.02 to 0.6 µm.

An intermediate layer can be provided between the support and the nonmagnetic layer or the magnetic layer and/or between the support and the backcoat layer to improve smoothness. For example, the intermediate layer can be formed by coating and drying a coating liquid comprising a polymer on the surface of the nonmagnetic support, or by coating a coating liquid comprising a compound (radiation-curable compound) comprising intramolecular radiation-curable functional groups and then irradiating it with radiation to cure the coating liquid.

A radiation-curable compound having a number average molecular weight ranging from 200 to 2,000 is desirably employed. When the molecular weight is within the above range, the relatively low molecular weight can facilitate coating flow during the calendering step, increasing moldability and permitting the formation of a smooth coating.

A radiation-curable compound in the form of a bifunctional acrylate compound with the molecular weight of 200 to 2,000 is desirable. Bisphenol A, bisphenol F, hydrogenated bisphenol A, hydrogenated bisphenol F, and compounds obtained by adding acrylic acid or methacrylic acid to alkylene oxide adducts of these compounds are preferred.

The radiation-curable compound can be used in combination with a polymeric binder. Examples of the binder employed in combination are conventionally known thermoplastic resins, thermosetting resins, reactive resins, and mixtures thereof. When the radiation employed is UV radiation, a polymerization initiator is desirably employed in combination. A known photoradical polymerization initiator, photocationic polymerization initiator, photoamine generator, or the like can be employed as the polymerization initiator.

A radiation-curable compound can also be employed in the nonmagnetic layer.

The thickness of the magnetic layer can be optimized based on the saturation magnetization of the head employed, the length of the head gap, and the recording signal band, and is normally 10 to 150 nm, preferably 20 to 120 nm, more preferably 30 to 100 nm, and further preferably 30 to 80 nm. The thickness variation ($\sigma/\delta$) in the magnetic layer is preferably within ±50 percent, more preferably within ±30 percent. At least one magnetic layer is sufficient. The magnetic layer may be divided into two or more layers having different magnetic characteristics, and a known configuration relating to multi-layered magnetic layer may be applied.

The thickness of the nonmagnetic layer ranges from, for example, 0.1 to 3.0 µm, preferably 0.2 to 2.0 µm, and more preferably 0.3 to 1.5 µm. The nonmagnetic layer is effective so long as it is substantially nonmagnetic in the magnetic recording medium of the present invention. For example, it exhibits the effect of the present invention even when it comprises impurities or trace amounts of magnetic material that have been intentionally incorporated, and can be viewed as substantially having the same configuration as the magnetic recording medium of the present invention. The term "substantially nonmagnetic" is used to mean having a residual magnetic flux density in the nonmagnetic layer of equal to or less than 10 mT, or a coercivity of equal to or less than 7.96 kA/m (100 Oe), it being preferable not to have a residual magnetic flux density or coercivity at all.

Backcoat Layer

The method of manufacturing a magnetic recording medium of the present invention can form a magnetic recording medium having a backcoat layer on the opposite surface of the nonmagnetic support from the surface on which the magnetic layer is present. The backcoat layer desirably comprises carbon black and inorganic powder. The surface-modifying agent can also be added to the backcoat layer. Such addition can increase adsorption of the powder and binder in the backcoat layer and thus increase the dispersibility of the powder. Details of the quantity and method of addition of the surface-modifying agent that is added in such cases are as set forth above for the magnetic layer coating liquid.

The compositions of the magnetic layer and nonmagnetic layer can be applied to the binder and various additives of the backcoat layer. In particular, the composition of the nonmagnetic layer can be applied. The thickness of the backcoat layer is desirably equal to or less than 0.9 µm, preferably 0.1 to 0.7 µm.

Details of desirable physical properties and the like of the magnetic recording medium manufactured by the manufacturing method of the present invention are as set forth further below for the magnetic recording medium of the present invention.

The method of preparing the magnetic layer coating liquid is as set forth above. The coating liquids for forming other layers, such as the nonmagnetic layer and the backcoat layer, can also be prepared by the same method.

In the process of manufacturing the magnetic recording medium, for example, the nonmagnetic layer can be formed by coating a nonmagnetic layer coating liquid to a prescribed film thickness on the surface of a nonmagnetic support while the nonmagnetic support is running, and then the magnetic layer can be formed by coating a magnetic layer coating liquid to a prescribed film thickness thereover. Multiple magnetic layer coating liquids can be successively or simultaneously coated in a multilayer coating, and the nonmagnetic layer coating liquid and the magnetic layer coating liquid can be successively or simultaneously applied in a multilayer coating. Coating machines suitable for use in coating the magnetic layer and nonmagnetic layer coating liquids are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters, and the like. For example, "Recent Coating Techniques" (May 31, 1983), issued by the Sogo Gijutsu Center K.K., which is expressly incorporated herein by reference in its entirety, may be referred to in this regard.

For a magnetic tape, the coating layer that is formed by applying the magnetic layer coating liquid can be magnetic field orientation processed using cobalt magnets or solenoids on the ferromagnetic powder contained in the coating layer. In the case of a disk, adequately isotropic orientation can sometimes be achieved with no orientation without using an orienting device. However, the diagonal arrangement of cobalt magnets in alternating fashion or the use of a known random orienting device such as a solenoid to apply an a.c. magnetic field is desirable. In the case of a ferromagnetic metal powder, the term "isotropic orientation" generally means randomness in the two in-plane dimensions, but can also be three-dimensional randomness when the vertical component is included. A known method such as magnets with opposite poles positioned opposite each other can also be employed to impart isotropic magnetic characteristics in a circumferential direction by effecting vertical orientation. When conducting particularly high-density recording, vertical orientation is desirable. Spin coating can also be employed to effect circumferential orientation.

The drying position of the coating is desirably controlled by controlling the temperature and flow rate of drying air, and coating speed. A coating speed of 20 m/min to 1,000 m/min and a dry air temperature of equal to or higher than 60° C. are desirable. Suitable predrying can be conducted prior to entry into the magnet zone. As set forth above, the reaction product generated following contact and reaction of the powder surface and surface-modifying agent can be removed in a drying step.

The coated stock material obtained in this manner is normally temporarily rolled on a pickup roll, and after a period, wound off the pickup roll and subjected to calendering.

In calendering, super calender rolls or the like can be employed. Calendering can enhance the smoothness of the surface, eliminate voids produced by removing the solvent during drying, and increase the fill rate of ferromagnetic powder in the magnetic layer, yielding a magnetic recording medium with good electromagnetic characteristics. The calendering step is desirably conducted by varying the calendering conditions based on the smoothness of the surface of the coated stock material.

The surface smoothness of the coated stock material can be controlled by means of the calender roll temperature, calender roll speed, and calender roll tension. The calender roll pressure and calender roll temperature are desirably controlled by taking into account the characteristics of the particulate medium. Lowering the calender roll pressure or calender roll temperature can decrease the surface smoothness of the final product. Conversely, raising the calender roll pressure or calender roll temperature can increase the surface smoothness of the final product.

Additionally, following the calendering step, the magnetic recording medium can be thermally processed to cause thermosetting to proceed. Such thermal processing can be suitably determined based on the blending formula of the magnetic layer coating liquid. An example is 35 to 100° C., desirably 50 to 80° C. The thermal processing period is, for example, 12 to 72 hours, desirably 24 to 48 hours.

Calender rolls made of epoxy, polyimide, polyamide, polyamideimide, and other heat-resistant plastic rolls can be employed. Processing can also be conducted with metal rolls.

Among the calendering conditions, the calender roll temperature, for example, falls within a range of 60 to 100° C., desirably a range of 70 to 100° C., and preferably a range of 80 to 100° C. The pressure, for example, falls within a range of 100 to 500 kg/cm (approximately 98 to 490 kN/m), preferably a range of 200 to 450 kg/cm (approximately 196 to 441 kN/m), and preferably a range of 300 to 400 kg/cm (approximately 294 to 392 kN/m). To increase the smoothness of the magnetic layer surface, the nonmagnetic layer surface can also be calendered. Calendering of the nonmagnetic layer is also desirably conducted under the above conditions.

The magnetic recording medium that is obtained can be cut to desired size with a cutter or the like for use. The cutter is not specifically limited, but desirably comprises multiple sets of a rotating upper blade (male blade) and lower blade (female blade). The slitting speed, engaging depth, peripheral speed ratio of the upper blade (male blade) and lower blade (female blade) (upper blade peripheral speed/lower blade peripheral speed), period of continuous use of slitting blade, and the like can be suitably selected.

Physical Properties

The magnetic layer desirably has a surface roughness, as a centerline average roughness, ranging from 1.0 to 3.0 nm. The magnetic layer having a centerline average roughness of equal to or lower than 3.0 nm can achieve good electromagnetic characteristics. With a centerline average roughness of equal to or greater than 1.0 nm, stable running can be achieved. The centerline average roughness of the magnetic layer preferably ranges from 1.5 to 3.0 nm, more preferably from 1.5 to 2.5 nm. The magnetic layer having an excellent surface roughness can be formed by using the surface-modifying agent. The surface roughness of the magnetic layer can also be controlled by adjusting dispersion conditions of the magnetic layer coating liquid, calendering conditions, the quantity of fillers in the nonmagnetic support, using an undercoating layer for enhancing smoothness, and the like.

The coercivity (Hc) of the magnetic layer is preferably 143.2 to 318.3 kA/m (approximately 1,800 to 4,000 Oe), more preferably 159.2 to 278.5 kA/m (approximately 2,000 to 3,500 Oe). Narrower coercivity distribution is preferable. The SFD and SFDr are preferably equal to or lower than 0.8, more preferably equal to or lower than 0.5.

The coefficient of friction of the magnetic recording medium of the present invention relative to the head, is, for example, equal to or less than 0.50 and preferably equal to or less than 0.3 at temperatures ranging from −10° C. to 40° C. and humidity ranging from 0 percent to 95 percent, the surface resistivity on the magnetic surface preferably ranges from $10^4$ to $10^8$ ohm /sq, and the charge potential preferably ranges from −500 V to +500 V. The modulus of elasticity at 0.5 percent extension of the magnetic layer preferably ranges from 0.98 to 19.6 GPa (approximately 100 to 2,000 kg/mm$^2$) in each in-plane direction. The breaking strength preferably ranges from 98 to 686 MPa (approximately 10 to 70 kg/mm$^2$). The modulus of elasticity of the magnetic recording medium preferably ranges from 0.98 to 14.7 GPa (approximately 100 to 1500 kg/mm$^2$) in each in-plane direction. The residual elongation is preferably equal to or less than 0.5 percent, and the thermal shrinkage rate at all temperatures below 100° C. is preferably equal to or less than 1 percent, more preferably equal to or less than 0.5 percent, and most preferably equal to or less than 0.1 percent.

The glass transition temperature (i.e., the temperature at which the loss elastic modulus of dynamic viscoelasticity peaks as measured at 110 Hz with a dynamic viscoelastometer, such as RHEOVIBRON) of the magnetic layer preferably ranges from 50 to 180° C., and that of the nonmagnetic layer preferably ranges from 0 to 180° C. The loss elastic modulus preferably falls within a range of $1 \times 10^7$ to $8 \times 10^8$ Pa (approximately $1 \times 10^8$ to $8 \times 10^9$ dyne/cm$^2$) and the loss tangent is preferably equal to or less than 0.2. Adhesion failure tends to occur when the loss tangent becomes excessively large. These thermal characteristics and mechanical characteristics are desirably nearly identical, varying by equal to or less than 10 percent, in each in-plane direction of the medium.

The residual solvent contained in the magnetic layer is preferably equal to or less than 100 mg/m$^2$ and more preferably equal to or less than 10 mg/m$^2$. The void ratio in the coated layers, including both the nonmagnetic layer and the magnetic layer, is preferably equal to or less than 40 volume percent, more preferably equal to or less than 30 volume percent. Although a low void ratio is preferable for attaining high output, there are some cases in which it is better to ensure a certain level based on the object. For example, in many cases, larger void ratio permits preferred running durability in disk media in which repeat use is important.

Physical properties of the nonmagnetic layer and magnetic layer may be varied based on the objective in the magnetic recording medium of the present invention. For example, the modulus of elasticity of the magnetic layer may be increased to improve running durability while simultaneously employing a lower modulus of elasticity than that of the magnetic layer in the nonmagnetic layer to improve the head contact of the magnetic recording medium.

Coating Material

The present invention also relates to a coating material comprising a powder and a binder, further comprising a compound (surface-modifying agent) denoted by the above general formula (I). In the coating material of the present invention, the surface-modifying agent can improve adsorption of the powder and the binder, resulting in high dispersibility of the powder.

In one embodiment, the powder in the coating material of the present invention can be a magnetic powder, preferably a ferromagnetic hexagonal ferrite powder. In that case, the coating material of the present invention is a magnetic coating material, preferably a coating liquid for forming a magnetic layer of a magnetic recording medium.

In another embodiment, the powder in the coating material of the present invention can be a nonmagnetic powder. In that case, the coating material of the present invention is a nonmagnetic coating material, preferably a coating liquid for forming a nonmagnetic layer of a magnetic recording medium.

Details of the coating material of the present invention are as set forth above for coating liquids for forming a magnetic layer and a nonmagnetic layer.

EXAMPLES

The present invention will be described in detail below based on Examples. However, the present invention is not limited to the examples.

1. Examples and Comparative Examples using Ferromagnetic Hexagonal Ferrite Powder Example 1

A 7.2 weight part quantity of the ferromagnetic hexagonal ferrite powder indicated below, 1 weight part of sulfonic acid group-containing polyurethane (sulfonic acid group content: $3.3 \times 10^{-4}$ mol/g), and 0.38 weight part of triethyl orthoacetate were suspended in solvent comprised of 3.3 weight parts of cyclohexanone and 4.9 weight parts of 2-butanone. To the suspension were added 27 weight parts of zirconia beads (made by Nikkato) and the suspension was dispersed for 6 hours.

The ratio of the presence of polyurethane on the magnetic powder surface/in the solution within the dispersion was 3.2/1 as measured by the method given below. The liquid obtained was coated and dried to fabricate a magnetic sheet. The gloss value of the magnetic sheet was measured at 197. The higher the gloss value, the better the dispersion of the ferromagnetic powder indicated. The gloss value was measured with a GK-45D made by Suga Test Instruments Co., Ltd. The liquid obtained was distilled at 100° C. and the distillate was analyzed by NMR, revealing peaks corresponding to ethyl acetate and ethanol. When the liquid obtained was centrifugally separated and the quantity of water contained in the supernatant was measured by the Karl Fischer's method, the level was below the detection threshold.

Ferromagnetic Hexagonal Barium Ferrite Powder

Composition other than oxygen (molar ratio): Ba/Fe/Co/Zn=1/9/0.2/1

Hc: 176 kA/m (approximately 2200 Oe)

Average plate diameter: 25 nm

Average plate ratio: 3

Specific surface area by BET method: 65 m$^2$/g

σs: 49 A·m$^2$/kg (approximately 49 emu/g)

pH: 7

Stearylamine adsorption capacity: 4.5 µmol/m$^2$

Measurement Methods (1) Ratio of Presence of Binder on Powder Surface/in Solution Magnetic powder and solution were centrifugally separated under conditions of 100,000 rpm and 80 minutes in a small separation-use ultracentrifuge, the CS150GXL, made by Hitachi. A 3 mL quantity of the supernatant was weighed out for measurement. After being dried under conditions of 40° C. for 18 hours, the sample was dried under vacuum conditions at 140° C. for 3 hours. The weight of the dried sample was adopted as the solid component of unadsorbed binder and the ratio of the presence of the binder on the magnetic powder surface/in the solution was calculated.

(2) Stearylamine Adsorption Capacity

One weight part of ferromagnetic hexagonal barium ferrite powder was added to 10 weight parts of cyclohexanone and suspended at 250 rpm with a magnetic stirrer, after which a 1 mmol/mL cyclohexanone solution of stearylamine was added. Magnetic powder and solution were centrifugally separated under conditions of 100,000 rpm and 30 minutes in a small separation-use ultracentrifuge, the CS150GXL, made by Hitachi. A 3 mL quantity of the supernatant was weighed out and titrated with 0.1 N hydrochloric acid using a titration device to measure the amount of free stearylamine. The quantity of adsorbed stearylamine per unit area was adopted as the stearylamine adsorption capacity.

Example 2

With the exception that the 0.38 weight part of triethyl orthoacetate was replaced with 0.25 weight part of trimethyl orthoformate, the ratio of the presence of polyurethane on the powder surface/in the solution in a dispersion obtained by the same processing as in Example 1 was measured by the above-described method at 3.2/1. The liquid obtained was coated and dried to prepare a magnetic sheet. The gloss of the magnetic sheet was measured by the above-described method at a gloss level of 197.

Example 3

With the exception that the 0.38 weight part of triethyl orthoacetate was replaced with 0.62 weight part of trimethyl orthoformate, the ratio of the presence of polyurethane on the powder surface/in the solution in a dispersion obtained by the same processing as in Example 1 was measured by the above-described method at 3.5/1. The liquid obtained was coated and dried to prepare a magnetic sheet. The gloss of the magnetic sheet was measured by the above-described method at a gloss level of 196.

Example 4

With the exception that the 0.38 weight part of triethyl orthoacetate was replaced with 0.24 weight part of acetone dimethyl acetal, the ratio of the presence of polyurethane on the powder surface/in the solution in a dispersion obtained by the same processing as in Example 1 was measured by the above-described method at 4.5/1. The liquid obtained was coated and dried to prepare a magnetic sheet. The gloss of the magnetic sheet was measured by the above-described method at a gloss level of 191.

Example 5

With the exception that the 0.38 weight part of triethyl orthoacetate was replaced with 0.61 weight part of acetone dimethyl acetal, the ratio of the presence of polyurethane on the powder surface/in the solution in a dispersion obtained by the same processing as in Example 1 was measured by the above-described method at 3.6/1. The liquid obtained was coated and dried to prepare a magnetic sheet. The gloss of the magnetic sheet was measured by the above-described method at a gloss level of 191.

Example 6

With the exception that the 0.38 weight part of triethyl orthoacetate was replaced with 0.11 weight part of the acetal compound indicated below, the ratio of the presence of polyurethane on the powder surface/in the solution in a dispersion obtained by the same processing as in Example 1 was measured by the above-described method at 3.4/1. The liquid obtained was coated and dried to prepare a magnetic sheet. The gloss of the magnetic sheet was measured by the above-described method at 182.

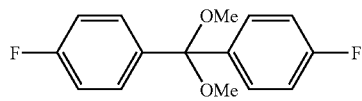

Comparative Example 1

With the exception that no triethyl orthoacetate was added, the ratio of the presence of polyurethane on the powder surface/in the solution in a dispersion obtained by the same processing as in Example 1 was measured by the above-described method at 2.6/1. The liquid obtained was coated and dried to prepare a magnetic sheet. The gloss of the magnetic sheet was measured by the above-described method at a gloss level of 174. When the liquid obtained was centrifugally separated and the quantity of water contained in the supernatant was measured by the Karl Fischer's method, the level was 0.66 percent.

The ratios of the presence of polyurethane on the magnetic powder surface in Examples 1 to 6 were higher than the ratio of the presence of polyurethane on the magnetic powder surface in Comparative Example 1. Thus, it will be understood that the acetal compound and orthoester compound denoted by general formula (I) modified the surface of the magnetic powder, and had the effect of increasing the level of polyurethane adsorbed. Since increasing the quantity of binder adsorbing to the magnetic material in the magnetic coating material relates to enhancing dispersion of the magnetic material, the addition of the compounds employed in the Examples increased the amount of binder adsorbing to the magnetic powder, thereby making it possible to confirm that the above compounds functioned as dispersing agents in the magnetic coating material. Since the gloss values of the magnetic sheets prepared in Examples 1 to 6 were higher than that of the magnetic sheet prepared in Comparative Example 1, it will be understood that the above compounds exhibited the effect of increasing dispersion of the magnetic powder in the magnetic coating material.

Based on the fact that ethyl acetate and ethanol, which are produced by the hydrolysis of triethyl orthoacetate, were detected in the distillate of the magnetic coating material obtained in Example 1, and the fact that the quantity of water in the supernatant of the magnetic coating material obtained in Example 1 was lower than the quantity of water in the supernatant of the magnetic coating material obtained in Comparative Example 1 (in which no triethyl orthoacetate was added), it is possible to confirm that the triethyl orthoacetate reacted with the adsorbed water on the surface of the magnetic powder, undergoing hydrolysis and thus removing the adsorbed water on the surface of the magnetic powder.

2. Examples and Comparative Examples using Nonmagnetic Powder (1)

Example 7

A 4.1 weight part quantity of the nonmagnetic powder indicated below, 1 weight part of sulfonic acid group-containing polyurethane (sulfonic acid group content: $0.6 \times 10^{-4}$ mol/g), and 0.38 weight part of triethyl orthoacetate were suspended in a solution comprised of 10.8 weight parts of cyclohexanone and 16.2 weight parts of 2-butanone. To the suspension were added 90 weight parts of zirconia beads (made by Nikkato) and the mixture was dispersed for 6 hours. The ratio of the presence of polyurethane on the surface of the nonmagnetic powder/in the solution was measured for the dispersed liquid at 1.5/1. The liquid obtained was coated and dried to prepare a sheet. The gloss value of the sheet was measured by the above-described method at 165. The higher the gloss value, the better the dispersion of nonmagnetic powder indicated.

Nonmagnetic Powder
α-iron oxide
Surface-treatment coating layer: $Al_2O_3$, $SiO_2$
Average major axis length: 0.15 μm
Average acicular ratio: 7
Specific surface area by BET method: 52 $m^2$/g
pH: 8
Stearylamine adsorption capacity (measured by the above-described method): 1.6 μmol/$m^2$ Comparative Example 2

With the exception that no triethyl orthoacetate was employed, the ratio of the presence of polyurethane on the nonmagnetic powder surface/in the solution in a dispersion obtained by the same processing as in Example 7 was measured by the above-described method at 1.0/1. The liquid obtained was coated and dried to prepare a sheet. The gloss of the sheet was measured by the above-described method at a gloss level of 155.

3. Examples and Comparative Examples using Nonmagnetic Powder (1)

Example 8

With the exception that the sulfonic acid group-containing polyurethane employed was changed to 1 weight part of polyurethane with a sulfonic acid group content of $3.3 \times 10^{-4}$ mol/g, the ratio of the presence of polyurethane on the nonmagnetic powder surface/in the solution in a dispersion obtained by the same processing as in Example 7 was measured by the above-described method at 0.4/1. The liquid obtained was coated and dried to prepare a sheet. The gloss value of the sheet was measured by the above-described method at 155.

Comparative Example 3

With the exception that no triethyl orthoacetate was employed, the ratio of the presence of polyurethane on the nonmagnetic powder surface/in the solution in a dispersion obtained by the same processing as in Example 8 was measured by the above-described method at 0.22/1. The liquid obtained was coated and dried to prepare a sheet. The gloss of the sheet was measured by the above-described method at a gloss level of 135.

The ratio of the presence of polyurethane on the nonmagnetic powder surface in Example 7 was higher than the ratio of the presence of polyurethane on the nonmagnetic powder surface in Comparative Example 2, and the ratio of the presence of polyurethane on the nonmagnetic powder surface in Example 8 was higher than the ratio of the presence of polyurethane on the nonmagnetic powder surface in Comparative Example 3. Thus, it will be understood that the compounds denoted by general formula (I) modified the surface of the nonmagnetic powder, having the effect of increasing the amount of polyurethane adsorbed. Since increasing the quantity of binder adsorbing to the nonmagnetic material in the nonmagnetic coating material relates to enhancing dispersion of the nonmagnetic powder, the addition of the compounds employed in the Examples increased the amount of binder adsorbing to the nonmagnetic powder, thereby making it possible to confirm that the above compounds functioned as dispersing agents in the nonmagnetic coating material. Since the gloss value of the sheet prepared in Example 7 was higher than that of the sheet prepared in Comparative Example 2, and since the gloss value of the sheet prepared in Example 8 was higher than that of the sheet prepared in Comparative Example 3, it will be understood that the above compounds exhibited the effect of increasing dispersion of the nonmagnetic powder in the nonmagnetic coating material.

The compound denoted by general formula (I) is suitable for use as a dispersing agent for magnetic and nonmagnetic coating materials, especially for coating liquids for forming magnetic and nonmagnetic layers of the magnetic recording medium.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

What is claimed is:

1. A method of modifying a surface of a ferromagnetic hexagonal ferrite powder, comprising mixing a ferromagnetic hexagonal ferrite powder with a compound denoted by general formula (I):

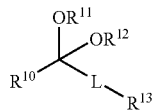 (I)

wherein, in general formula (I), each of $R^{10}$ and $R^{13}$ independently denotes a hydrogen atom, alkyl group, or aryl group, each of $R^{11}$ and $R^{12}$ independently denotes an alkyl group or an aryl group, and L denotes a single bond or an oxygen atom.

2. A method of modifying a surface of a magnetic powder, comprising mixing a magnetic powder with a compound denoted by general formula (I):

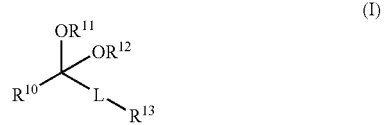 (I)

wherein, in general of (I), each of $R^{10}$ and $R^{13}$ independently denotes a hydrogen atom, alkyl group, or aryl group, each of in $R^{11}$ and $R^{12}$ indepenendently denotes an alkyl group or an aryl group, and L denotes a single bond or an oxygen atom, wherein the magnetic powder is comprised in a magnetic coating material.

3. The method of modifying a surface of a magnetic powder according to claim 2, wherein the surface of the magnetic powder is modified to improve dispersibility of the magnetic powder in the magnetic coating material.

* * * * *